United States Patent Office 3,493,391
Patented Feb. 3, 1970

3,493,391
PROCESS FOR PREPARING A FISH PRODUCT
James C. Pottie, Halifax, Nova Scotia, Canada, assignor to Nova Scotia Research Foundation, Halifax, Nova Scotia, Canada
No Drawing. Filed Nov. 28, 1966, Ser. No. 597,203
Int. Cl. A23l *1/325;* A22c *25/00*
U.S. Cl. 99—111                                                  3 Claims

ABSTRACT OF THE DISCLOSURE

The invention relates to a fish product and to a process of preparing the same wherein cleaned raw fish, which may contain its natural bone content but without any additive except possibly a relatively minute quantity of flavoring or pH adjusting agents, is subjected to a comminution step to produce a substantially rigid plastic mass. The comminution step, in one aspect of the invention, is intended to reduce the fish flesh fibers to fibril and proto-fibril size. When reduced to this size, a rigid gel inherently develops. This plastic mass or gel is extruded into suitable cooking shapes, which may be subsequently cooked. It is important that the environment of the fish during the comminution and extrusion steps and up to the subsequent cooking step be maintained at a temperature of 5° C. or less.

BACKGROUND OF THE INVENTION

Field of the invention

The invention is entirely in the field of fish products and processes of preparing same.

Description of the prior art

It has heretofore been proposed to prepare gels or foams from fish flesh for subsequent cooking to produce an edible product. United States Patents 3,114,639 and 3,099,562 are of interest in this regard. However, novelty of the present invention resides in the preparation of gel developed inherently from the fish flesh itself without the addition of gelling or foaming agents, as well as in the temperature conditions defined.

SUMMARY OF THE INVENTION

The invention may be said to reside broadly in a process of preparing a fish product which comprises comminuting material consisting essentially of raw fish to produce a substantially rigid plastic mass, maintaining said fish and mass in an environment having a temperature not exceeding 5° C. during said comminution step, and further maintaining said mass in an environment having a temperature not exceeding 5° C. during the entire period beginning with termination of said comminution step and up to subsequent cooking of said mass.

The invention also resides in a fish product comprising a cooked gel consisting essentially of fish flesh with or without an additive such as a flavoring or pH adjusting agent.

DESCRIPTION OF THE PREFERRED EMBODIMENTS

The raw material employed in accordance with the invention is the cleaned, dressed, edible portion of fishes. Preferably, but not necessarily, the fish employed are of the white-fleshed species. Fish fillets, or the cuttings from the filleting table, may be used. These cuttings usually contain a great number of bones. It is not necessary to remove these bones, which are a source of valuable minerals. No other special preparation of the raw fish material is required. For example, the fish may be in the fresh condition as it comes from the cutting table; it may be completely thaw-dripped, or thaw-dripped with slight surface dessication from standing. It may have been frozen for short or long periods, thawed to just before the thaw-drip begins, and then used. It may have been frozen for short or long periods, completely thaw-dripped, and then used. The important consideration is that the raw fish employed be free from any additive such as water or gelling agents. The temperature of the raw fish at this stage and before subsequent treatment is relatively unimportant. For instance, it may be partially frozen, as indicated above, or completely at room temperature, say, about 27° C. or higher.

The raw material is now subjected to a comminution treatment, which may or may not be preceded by a coarse grinding step.

An important and critical feature of the invention is that during the comminution and subsequent steps to be later described, no addition other than possibly a relatively minute quantity of flavoring or pH adjusting agents is made to the fish material. Thus, the raw material consists essentially of fish with or without a relatively minute quantity of flavoring or pH adjusting agents. For instance, minute quantities of sodium chloride, monosodium glutamate, or the like, may be added to modify texture and flavor, without detracting from or reducing the substantially pure fish character or condition of the product. More specifically, it is important that the use of gelling, thickening, stabilizing, emulsifying, and the like agents be avoided. The use of added water during the comminution step, which would result in subsequent shrinkage of the product, is, of course, to be avoided.

The comminution may be carried out in any suitable type of conventional apparatus. Thus, a conventional machine such as a Waring Blendor, having an upright vessel with a rotatably driven multi-bladed cutting device mounted in the lower portion thereof, is quite satisfactory.

It is important that the comminution step be conducted under temperature conditions not exceeding 5° C., that is, the comminution machine is located in an atmosphere not exceeding 5° C. whereby its contents reach and are maintained within a temperature range of 5–30° C.

The comminution step is continued until the raw material becomes a substantially rigid plastic mass. This plastic mass may be in semi-gel or gel form.

Each fish muscle fiber consists of a bundle of fibrils, each of which in turn comprises a bundle of proto-fibrils. The fibrils comprise two proteins, myosin and actomyosin. These proteins are hydrophilic colloids which, when they are released or extracted from the fibrils by the shearing action of the cutting knives, result in the formation of a gel. The fibrils and proto-fibrils are oriented in such a way in the mass that the natural water content of the fish is imprisoned in the spaces between the fibrils. The action of the cutting tools also incorporates air into the gel. The addition of sodium chloride further modifies the texture by furthering the extraction of the myosin and the actomyosin from the fish muscle.

The comminution step may be continued until a substantially rigid plastic mass with partial gel formation has occurred or until substantially complete rigid gel formation has been effected. Ordinarily, the comminution step is effected within a period of two to seven minutes.

The resulting plastic mass, in either semi-gel or gel form, is maintained at a temperature not exceeding its comminution temperature until cooked.

The mass may be placed in an extrusion device of conventional structure directly after formation and extruded in shaped bodies directly into hot deep cooking fat maintained at appropriate cooking temperature, and fried to the desired degree of crispness. Immediate extrusion into deep fat of appropriate temperature following semi-gel or gel formation seals in the flavor of the fish. The cooked shapes may, of course, be of any desired form with appropriate choice of extrusion nozzle.

It will be apparent that the final product of the invention may comprise simply the uncooked plastic mass in semi-gel or gel condition, but it is important that, if cooking of this product is to be delayed, the product must be frozen and kept in frozen state for later cooking.

If the cooking step is delayed, the mass may be frozen in a relatively large body for later thawing, replasticizing, extrusion, and cooking, or may be extruded into shapes and then frozen for later cooking. The term "frozen" in fish technology means a temperature of −20° C. or lower.

If desired, the raw material may be initially coarsely ground before being subjected to the comminution steps described.

As previously indicated, solid sodium chloride, or a solution thereof, may be incorporated into the plastic mass to modify its flavor and texture. Monosodium glutamate or like agents may be added to modify the flavor. pH adjusting agents may be added. Other flavoring materials, such as lemon juice, may be added.

The cooked product may be, for instance, in the form of a thin, rectangular crisp wafer about one inch wide and one to two inches long. Alternatively, it may be in the form of a crimped cylindrical crisp, about ⅛ inch in diameter, and from one to two inches long.

The term "environment" as used in this specification and appended claims is intended to include processing and handling equipment.

I claim:

1. A process of preparing a fish product which comprises comminuting material consisting essentially of raw fish in the absence of added water and gelling agents, continuing said comminution step until substantially all the muscle fibers of said fish are reduced to fibril and protofibril size and said material becomes a mass of rigid gel solely by said comminution, and maintaining said fish and mass in an environment having a temperature not substantially exceeding 5° C. during said entire comminution step and subsequently thereto until cooking of said mass.

2. A process of preparing a fish product as defined in claim 1, wherein said material consists essentially of cleaned raw fish containing its natural bone and water content.

3. A process of preparing a fish product as defined in claim 1, including the steps of extruding said mass into shapes directly following said comminution step, feeding said shapes directly following said extrusion step into deep cooking fat maintained at the cooking temperature of said shapes, and cooking said shapes in said fat.

References Cited

UNITED STATES PATENTS

| Re. 16,740 | 9/1927 | Birdseye | 99—111 |
| 1,920,222 | 8/1933 | Taylor | 99—14 |
| 3,114,639 | 12/1963 | Rivoche | 99—111 |
| 3,215,094 | 11/1965 | Oldershaw et al. | 99—100 |
| 3,268,339 | 8/1966 | Torr | 99—108 |

LIONEL M. SHAPIRO, Primary Examiner

R. M. ELLIOTT, Assistant Examiner